United States Patent Office 3,386,924
Patented June 4, 1968

3,386,924
CURING POLYEPOXY COMPOUNDS WITH TETRAHYDROTRICYCLOPENTADIENYLENE DIAMINE
Franz Steden, Mannheim, Hugo Schaedler, Maikammer, Pfalz, and Oskar Lissner and Ludwig Schuster, Ludwigshafen (Rhine), Germany, assignors to Badische Anilin- & Soda-Fabrik Aktiengesellschaft, Ludwigshafen (Rhine), Germany
No Drawing. Filed Nov. 15, 1965, Ser. No. 507,695
Claims priority, application Germany, Nov. 20, 1964, B 79,418
5 Claims. (Cl. 260—2)

This invention relates to curable mixtures based on polyepoxides and polyamines and cured resins prepared therefrom. It relates particularly to the use of special polyamines as hardeners for polyepoxide compounds.

It is known that polyepoxides may be reacted with polyamines for the production of insoluble and infusible moldings, coatings, and impregnated and bonded articles. Difficulties often arise in the reaction however unless a polyamine is used which is suitable for the particular polyepoxide compound. Aliphatic polyamines are usually too reactive with respect to conventional polyepoxides so that the possibilities of processing the curable mixtures are limited. On the other hand aromatic polyamines are not reactive enough so that high temperatures are required for curings. Moreover they have the disadvantage as compared with aliphatic polyamines that they are usually solids and are therefore limited in their processability. It is therefore often necessary to have recourse to the use of aliphatic polyamines which are, however, unsuitable for some purposes because moldings or coatings prepared therefrom have unsatisfactory chemical stability, particularly resistance to water.

It is an object of the present invention to provide epoxy resin compositions which may be cured even at room temperature and have favorable processing characteristics owning to a long pot life. It is a further object to provide epoxy resin compositions which give clear lacquers having good film-forming properties and showing no blooming effect. It is a further object to provide epoxy resins which are insoluble, infusible, very resistant to attack by chemical agents and have good impact and tensile strength, good heat resistance and high elongation. Other objects will be apparent from the following detailed description.

We have found that moldings or coatings of curable compositions based on (a) compounds which contain on an average more than one 1,2-epoxide group in the molecule and (b) polyamines with or without the additional use of other hardeners or cure accelerators, which have advantageous properties can be prepared particularly favorably by using as the polyamine tetrahydrotricyclopentadienylene diamine and/or substitution products thereof bearing alkyl groups having one to four carbon atoms.

Tetrahydrotricyclopentadienylene diamine having the structural formula:

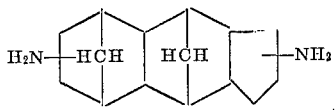

is a clear water white liquid having a boiling point of about 130° C. at 0.1 mm. Hg. It is accessible by simple synthesis from tricyclopentadiene, hydrocyanic acid and sulfuric acid and it occurs in its different isomeric forms. It may be purified easily by distillation. The production of the diamine is not the subject of the present invention.

The object of the invention is rather to use the diamine in curable mixtures with compounds containing more than one epoxide group per molecule for the production of moldings and coatings. Examples of particularly suitable compounds containing more than one 1,2-epoxide group per molecule are: aliphatic polyglycidyl ethers which are known to be obtainable by reaction of aliphatic polyalcohols, for example those having 2 to 20 carbon atoms in the molecule, such as pentaerythritol, glycerol, trimethylolpropane or butanediol, with epichlorohydrin. Other suitable polyexpoxides are aromatic polyglycidyl ethers and polyglycidyl esters obtainable by reaction of polyhydric phenols and aromatic polycarboxylic acids with epichlorohydrin and also reaction products of aliphatic and aromatic polyamines having 2 to 40 carbon atoms and about 2 to 10 amino groups with epichlorohydrin. Polyepoxides which are obtainable from olefinically unsaturated hydrocarbons and hydroperoxides, such as vinylcyclohexen dioxide, dipentene dioxide, cyclododecane triepoxide, may also be used successfully. Another group includes the glycidyl ethers of novolaks which may be obtained by condensing an aldehyde with a polyhydric phenol. The said polyepoxides may be used alone or mixed together, if necessary with an addition of monoepoxide compounds.

It is also possible for the polyamine used in accordance with this invention to be reacted with the polyepoxides in admixture with polyamine derivatives bearing alkyl groups as substituents or in admixture with other known amines having 2 to 40 carbon atoms. The choice from among known aliphatic, cycloaliphatic, aromatic and heterocyclic monoamines and polyamines of the amine components to be used with the amine according to this invention depends on the type of polyepoxide and on the use to which the products made from the curable mixtures are to be put. Examples of suitable amines are: dodecylamine, diethylene triamine, 3,3'-dimethyl-4,4'-diaminodicyclohexylmethane, 4,4'-diaminodiphenylsulfone, 4,4'-diaminodiphenylmethane and particularly tetrahydrotricyclopentadienyl monoamine which occurs as a by-product in the production of tetrahydrotricyclopentadienylene diamine. The ratio of the tetrahydrotricyclopentadienylene diamine or its substitution products to the total amount of amines used may vary within wide limits. In general the amine component consists of 50 to 100% by weight, particularly 70 to 100% by weight, of unsubstituted or substituted tetrahydrotricyclopentadienylene diamine and 0 to 50% by weight, particularly 0 to 30% by weight, of other monoamines or polyamines conventionally used for this purpose.

The ratio of the amine component to the epoxide component in the mixture is usually chosen so that for each 1,2-epoxide group of the polyepoxide compound there is available one active hydrogen atom attached to nitrogen in the amine component (equivalent amount). In some cases, for example when the polyepoxides are combined with fillers, it may be advantageous to use an excess of amine, for example one to three times the equivalent amount, particularly up to one and one half times the equivalent amount. The mixtures prepared from the polyepoxide compounds and the amine components may be processed without solvents or with solvents. Conventional solvents, such as ketones, esters, alcohols, glycol ethers or hydrocarbons, are added particularly when making lacquer coatings, laminates or impregnated articles. When preparing lacquer coatings it is also favorable to add a few per cent of leveling agents, for which purpose for example urea-formaldehyde resins, phenol-formaldehyde resins and ketone resins may be used.

For some purposes it may be advantageous to replace in the curable mixtures used for the preparation of moldings or coatings, part of the amines, e.g. 0.1 to 50% by weight, by other conventional curing agents, such as amides, polyamides or polycarboxylic anhydrides. Hardeners which may be used are for example described in the book by A. M. Paquin, "Epoxydverbingungen und Epoxydharze," Springer-Verlag, Berlin-Gottingen-Heidelberg, 1958, 470–530. Sometimes incorporation of cure accelerators, for example basic catalysts, such as potassium hydroxide, sodium methylate, tertiary amines; acid catalysts, such as sulfuric acid, phosphoric acid, boric acid or Friedel-Crafts catalysts is of advantage.

The use of tetrahydrotricyclopentadienylene diamine in accordance with this invention is attended by advantages in processing the compositions and by an improvement in the properties of the products. Tetrahydrotricyclopentadienylene diamine is not so reactive with polyepoxide compounds as aliphatic polyamines so that it is easier to process the curable compositions because they have a longer pot life. There is the further advantage over aliphatic polyamides that lacquers prepared with tetrahydrotricyclopentadienylene diamine require no prereaction and dry in a short time. In contrast to aromatic amines, tetrahydrotricyclopentadienylene diamine makes curing at room temperature possible, although the reaction can be carried out at any temperature in the range from 20 to 200° C., particularly 20 to 120° C.

Moldings or coatings prepared from the mixtures of polyepoxide and amine are insoluble, infusible, have good impact strength and heat resistance and high elongation, tensile strength and tear resistance. Moreover the products are waterproof and very resistant to attack by chemical reagents and by salts and alkalies. Lacquers prepared therefrom are clear, have good film-forming properties and do not show any blooming effect. Curable mixtures according to this invention may be used, among other things, for the production of laminates, electric encapsulating compositions, and impregnated and bonded articles.

The invention is illustrated by the following examples. The parts and percentages specified in the following examples are units of weights unless stated otherwise.

Example 1

16.2 parts of a reaction product of pentaerythritol with epichlorohydrin having an epoxide number of 0.62 is stirred with 5.9 parts of tetrahydrotricyclopentadienylene diamine at room temperature to form a homogeneous mixture, which is poured into molds. After standing for twelve hours at room temperature and being annealed for two hours at 70° C., a tack-free colorless and clear molding is obtained having a thermal stability of 110° C.

Example 2

16.2 parts of a reaction product of pentaerythritol with epichlorohydrin having an epoxide number of 0.62 is mixed with 6.5 parts of a mixture of tetrahydrotricyclopentadienylene diamine and tetrahydrotricyclopentadienyl monoamine (molar ratio 0.68:0.32) at room temperature and poured into molds. After twenty-four hours at 25° C. and two hours at 70° C., a clear and colorless molding is obtained having a thermal stability of 105° C.; it is stable in acids, alkaline solutions and water.

Example 3

The curable mixture of Example 2 is applied to sheet metal and cured for twenty-four hours at room temperature and two hours at 70° C. Testing the hard and tough coating, which shows excellent adhesion, gives an Erichsen number of 8.2 and a pendulum hardness of 128 seconds.

Example 4

36 parts of tetrahydrotricyclopentadienylene diamine is mixed with 100 parts of an aliphatic polyglycidyl ether of pentaerythritol and epichlorohydrin having an epoxide number of 0.62. The liquid mixture (free from solvent) has a pot life of ninety minutes at room temperature. When applied in a layer having a thickness of 100 microns to a sheet of glass, a pale clear film is obtained which at room temperature is tack-free after only 2.5 hours after application and is completely cured in another 5.5 hours. The resultant coating dried in the air is distinguished by its hardness, waterproofness and stability to salts and alkalies.

Example 5

A 50% solution (in a mixture of equal parts by volume of methyl isobutyl ketone, ethylene glycol monoethyl ether and xylene) is prepared from an epoxide resin of 1 mole of 4,4-dihydroxydiphenylpropane and 2 moles of epichlorohydrin having an epoxide number of 0.2. 100 parts of this solution is mixed with 2 parts of a 60% solution of an unplasticized urea-formaldehyde resin in butanol and then 6 parts of tetrahydrotricyclopentadienylene diamine is stirred into the mixture. The resultant lacquer, which is capable of being used for three and a half days, provides on application a clear, haze-free film which at room temperature is tack-free after two and a half hours and is completely cured after twenty hours. The film is distinguished by great hardness, good elasticity, waterproofness and resistance to alkalies, salt solutions and aliphatic and aromatic hydrocarbons.

Equivalent lacquers prepared under the same conditions but using ethylene diamine, diethylene triamine or propylene triamine give cloudy coatings which are sensitive to water.

We claim:
1. A curable composition comprising
   (A) a poly-1,2-epoxide compound and
   (B) tetrahydrotricyclopentadienylene diamine,
   (C) being present in about 1 to 3 times the equivalent amount of (A).
2. A curable composition as claimed in claim 1 wherein the poly-1,2-epoxide compound is a polyglycidyl ether of a polyhydric compound selected from the group consisting of aliphatic polyalcohols and polyhydric phenols.
3. A curable composition as claimed in claim 1 wherein up to 50% by weight of the tetrahydrotricyclopentadienylene diamine is replaced by an other conventional epoxy during agent.
4. A curable composition as claimed in claim 1 wherein up to 50% by weight of the tetrahydrotricyclopentadienylene diamine is replaced by an other amine having 2 to 40 carbon atoms.
5. A composition as claimed in claim 1 when cured to an infusible and insoluble resinous composition.

References Cited

UNITED STATES PATENTS 2,801,229   7/1957   De Hoff et al. _____ 260—47

WILLIAM H. SHORT, Primary Examiner.
T. D. KERWIN, Assistant Examiner.

UNITED STATES PATENT OFFICE
CERTIFICATE OF CORRECTION

Patent No. 3,386,924            June 4, 1968

Franz Steden et al.

It is certified that error appears in the above identified patent and that said Letters Patent are hereby corrected as shown below:

Column 3, line 3, "Epoxydverbingungen" should read -- Epoxydverbindungen --. Column 4, line 52, "during agent" should read -- curing agent --.

Signed and sealed this 16th day of December 1969.

(SEAL)
Attest:

Edward M. Fletcher, Jr.            WILLIAM E. SCHUYLER, JR.
Attesting Officer            Commissioner of Patents